June 12, 1962     H. H. NELSON ET AL     3,038,994
HEAT-SENSITIVE RECORDER
Filed May 20, 1957
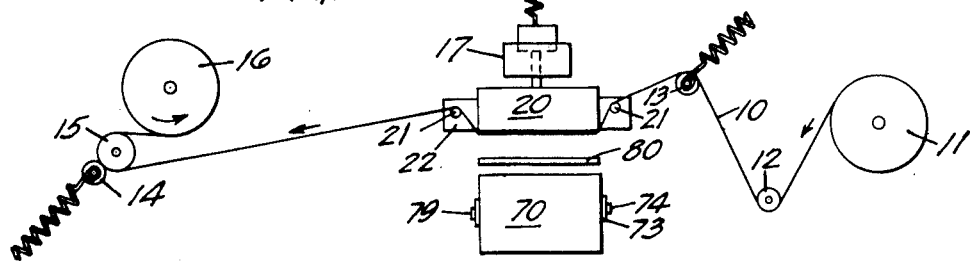
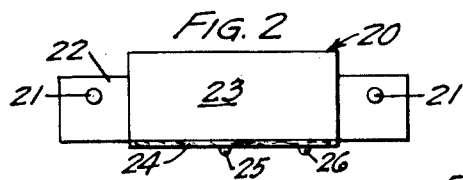
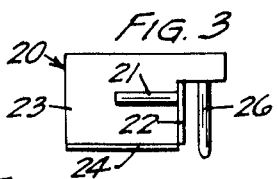
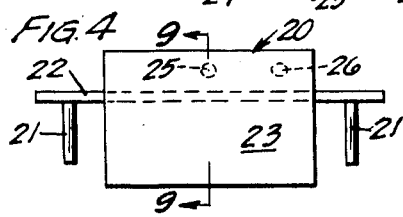
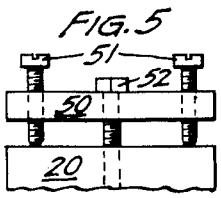
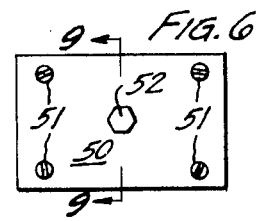
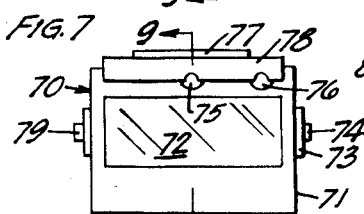
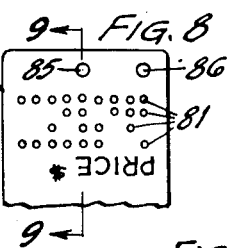
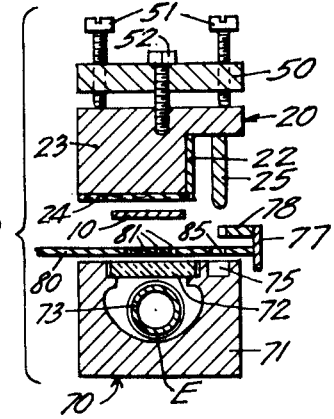
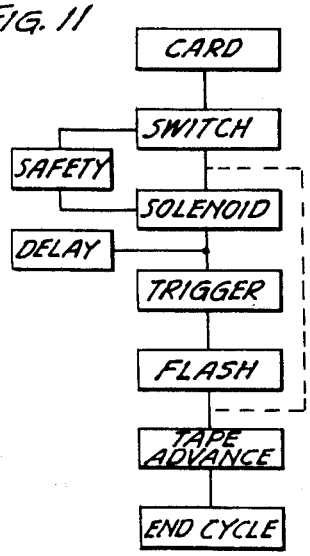
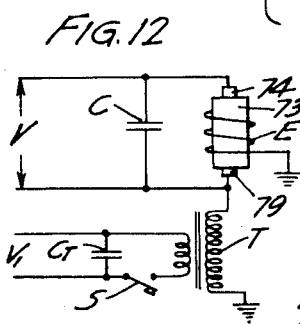
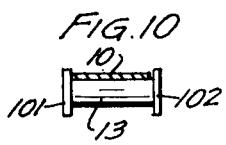
INVENTORS
HAROLD H. NELSON
ARTHUR R. KOTZ
Carpenter, Abbott, Coulter & Kinney
ATTORNEYS

United States Patent Office 3,038,994
Patented June 12, 1962

3,038,994
HEAT-SENSITIVE RECORDER
Harold H. Nelson, West St. Paul, and Arthur R. Kotz, Falcon Heights, Minn., assignors to Minnesota Mining and Manufacturing Company, St. Paul, Minn., a corporation of Delaware
Filed May 20, 1957, Ser. No. 660,394
8 Claims. (Cl. 250—65)

This invention relates to the assembling on a continuous record member of information initially available from separate independent sources. More specifically, the invention relates to the recording on a continuous tape of inventory and sales information or the like as contained on punched or printed cards or tickets, and has particular reference to recording apparatus for such use and in which the continuous record member is a visibly heat-sensitive or thermographic copy-paper.

There is need in many industries for more accurate and less time-consuming means of maintaining inventory records. As an example, in the garment industry it is common practice to attach to each garment a sales ticket containing cost and other information, to periodically check such information from all unsold garments, and to maintain perpetual inventory by requiring that the ticket, or some portion thereof, be removed from the garment at time of sale and retained for inventory control purposes. The tickets are difficult to handle, easily misplaced or lost, and bothersome to read. Removing a portion of a ticket frequently leads to its mutilation, annoys the customer, or makes necessary the preparation of a new ticket in the event the garment is returned or sent to a different department.

The present invention, while not restricted thereto, makes possible the use of one-piece tickets which remain attached to the garment, and provides for transfer of information from the ticket to a continuous record tape which can then be sent to the auditing department or elsewhere for inventory control or other purposes. The information is transferred to the tape easily and quickly by semi-automatic means, and in condition for assimilation by automatic reading and tabulating machines at a central office. The transferred information is directly visible for immediate visual comparison with the original. Clear and easily deciphered markings are obtained on the tape from slightly torn or "fuzzy" originals as well as from those having no such defects. Moderate crumpling or folding of the ticket does not impair the accuracy of the copy.

In the drawing,
FIGURE 1 is a schematic representation of the recorder in position for copying information;
FIGURES 2, 3 and 4 are front elevation, end elevation, and plan view respectively of a movable upper platen;
FIGURES 5 and 6 are end elevation and plan views respectively of a leveling and supporting member associated with the movable upper platen;
FIGURE 7 is a plan view of a corresponding lower platen and associated card-aligning components;
FIGURE 8 is a plan view of a portion of a typical sales ticket;
FIGURE 9 is a cross-section of the components of FIGURES 4 and 6-8 in associated operative position, taken along the line 9—9 of said figures;
FIGURE 10 is a detailed view of a control roller 13 of FIGURE 1;
FIGURE 11 is a block diagram indicating the operating cycle of the recorder of FIGURE 1; and
FIGURE 12 is a circuit diagram of a preferred trigger circuit for the flash tube of FIGURE 7.

The operation of the recorder as schematically represented in FIGURE 1 is essentially as follows:

A strip 10 of heat-sensitive copy-paper is withdrawn from reel 11 under moderate maintained tension around a sensing roller 12 and a movable spring-loaded constant tension roller 13. The strip then passes beneath a vertically movable platen 20, around measuring roll 15, and finally to windup reel 16. A lower platen 70 is located beneath movable platen 20 and acts as support for the card or sales ticket 80 of which a copy is desired. A spring-loaded pressure roll 14 supports the tape 10 in non-slipping contact with the measuring roll 15. The platen 20 is movable toward and away from the platen 70 by means of a spring-return electromagnet 17. During such movement the tape 10 is maintained in position against the face of the platen 20 by guide pins 21 supported on guide plate 22, tension being maintained in the tape by the spring-loaded roller 13.

In operation, the insertion of the sales ticket 80 between the platens 20 and 70 actuates the mechanism to operation in the following sequence.

The platen 20 descends to press the copy strip 10 tightly against the desired area of the sales ticket 80 and against the lower platen 70, under a force sufficient to flatten wrinkled or crumpled cards and to hold the card and copy-strip closely together. A source of radiation contained within the lower platen is caused to fire, thereby copying the intelligence contained on the ticket onto the copy strip. The upper platen rises, permitting removal of the ticket, and the copy strip is drawn forward a measured distance as determined by the measuring roll 15, permitting visual inspection of the printed area within the space between the platen and the roll. The apparatus is then ready for the insertion of a subsequent card or ticket for copying.

The action is extremely rapid, requiring not more than about two seconds for a complete recording cycle. Breakage of the copy strip by the sudden jerky motion imparted by the electromagnet is avoided, however, by the smoothing action of the spring-loaded takeup roll 13.

Tension is applied to the copy strip by the windup reel 16 operating under power applied, by means not shown, through a suitable non-reversible clutch mechanism. A breaking device on reel 11 is adjusted in accordance with the spring tension on roller 13 to maintain the tape under the desired tension while permitting it to be drawn forward as needed. The sensing element 12 operates to prevent actuation of the apparatus in the event the strip 10 is exhausted or broken.

The measuring roll 15 permits the passage in a single cycle of just enough of the copying strip to provide for a single copy. Through suitable cam arrangement or equivalent, this roll stops the action of the windup reel 16 after the completion of a full revolution of the measuring roll.

The upper platen 20 is shown in more detail in FIGURES 2-4. The platen consists primarily of a base 23 covered on the flat lower surface with an elastic pad 24 providing for uniform pressure, and which may be a felt pad, and carrying vertically disposed guide plate 22 to the extended face areas of which are attached guide pins 21.

During operation of the device, the rearward edge of the strip 10 of heat-sensitive copying-paper is held snugly against the extended flat face areas of the guide plate 22 to provide for accurate alignment within the printing area.

The movable upper platen 20 is further provided with alignment pins 25, 26 protruding just slightly below the plane of the lower surface of the pad 24. The pins are so spaced and dimensioned as to enter corresponding alignment holes in the card or ticket. Those illustrated are designed for the card 80 of FIGURE 8 and having two such corresponding holes 85, 86, one being located centrally of the width of the card. The pin 25 will enter this central hole regardless of whether or not the card is placed face-up in the machine; but the pin 26 fits only when the card is properly placed. Pin 26 is therefore provided with spring loading and switch means, not shown, so that the pin will be depressed and the radiation-firing mechanism will not be actuated when the card is inserted in face-down position. With other card styles, it may be necessary to provide both alignment pins with spring loading and switch means to ensure proper alignment before firing.

The platen assembly 20 is operated by spring-loaded electromagnet 17 as previously noted, and may be mechanically connected therewith either directly or indirectly. A preferred system is illustrated in FIGURES 5 and 6, showing the platen assembly 20 attached to a leveling plate 50 which in turn is suitably supported in the recorder mechanism, and connected to the spring-loaded electromagnet 17 or equivalent actuating element, by means not shown. The leveling mechanism, here shown to consist of screws 51 and attachment bolt 52, permits the pressure face of the platen assembly 20 to be placed in exact alignment with the pressure face of the lower platen unit 70.

The lower platen assembly illustrated in FIGURE 7, and in cross-section in FIGURE 9, is shown to consist of a hollow internally reflective base 71 having a transparent upper surface formed by a transparent glass plate 72. A source of radiation, in the form of a tubular lamp 73, is supported within the hollow interior coaxially with the focus of the parabolic reflecting chamber. The upper sides of the chamber are constricted to form supporting shoulders for the transparent plate. Suitable openings 75, 76 are provided to receive the projecting tips of the alignment pins 25, 26 of the upper platen 20 when the latter is forced against the upper face of the lower platen 70.

A card alignment plate 77 and a card release plate 78 are included in the lower platen assembly in the position shown. The plane of the alignment plate is parallel to the plane of the two alignment pins 25, 26. The forward edge of the release plate is in the plane of the pins and is therefore suitably cut away, as shown, to provide clearance for said pins when the upper platen is depressed toward the lower platen.

The sales ticket or card 80 of FIGURE 8 is indicated in cross-section in FIGURE 9 in position for copying. The ticket will be seen to carry information in the form of punched holes 81, as well as the alignment holes 85, 86. In the system illustrated, one row of holes is continuous and serves to orient the reading mechanism. The requirement that this row be parallel to the edge of the tape 10 is a principal reason for the presence of alignment holes 85, 86. The remaining holes are parallelly arranged in several rows and represent coded information of which a record is desired. Obviously the card 80 may carry printed matter or other indicia, an example being provided in the drawing.

As also shown in FIGURE 9, the card enters the assembly with its innermost edge beneath the release plate 78, and presumably in full contact with the alignment plate 77. Alignment is preliminarily established by providing a narrow slot through which the card or ticket 80 is inserted into the recorder. However there must still be some freedom of movement of the card, and it has been found that even with these precautions the card may at times be inserted with the innermost edge at an angle with the alignment plate 77. In this position, final accurate alignment of the card is impossible, since one or both of the pins 25, 26 will be prevented from easily entering the respective holes 85, 86 in the card. Where accurate final alignment is required, it has therefore been found desirable to make further provision for ensuring the accuracy of the preliminary alignment. This result is accomplished by means of a pair of actuating switches connected in series and located one at either end of the alignment plate 77, and so positioned that both are actuated when the card 80 is in full edge contact with the plate.

It will be appreciated that, where exact alignment is not required, a single actuating switch may replace the pair of switches just described, and other elements of the apparatus may analogously be greatly simplified. However it is ordinarily preferable to rely on exact alignment at the recorder instrument in order to simplify the construction and operation of the central office reading and tabulating equipment.

The rapid action of the device, and the accurate fit of the pins 25, 26 in the holes 85, 86, makes difficult the removal of the card from the device after the copy cycle. The release plate 78 assists in the removal operation by stripping the card 80 from the pins as the platen 23 rises.

In order that the copy strip may progress in constant contact with the extended flat face areas of the guide plate 22, rollers 13 and 16 are provided with extended forward flanges as indicated for the roll 13 in FIGURE 10. In this figure, the roll 13 has a forward flange 101 and a rearward flange 102, their inner faces being spaced apart a distance slightly greater than the width of the copy strip 10, shown here in cross-section. Roll 16 is similarly designed, and these rolls are located with the inner faces of the forward flanges in a plane separated from the plane of the forward surface of the guide plate 22 by a distance just slightly less than the width of the copy strip.

Although other sources of intense radiation are useful under many less critical conditions, flash sources employing an electronic gas discharge tube provide the desired high speed with a minimum of extraneous heating, and such tubes have longer useful lives than, for example, tungsten filament lamps; and the flash source is therefore preferred. The tube 73 of the drawing comprises an envelope fitted with anode and cathode contacts 74 and 79 and in addition provided with an external trigger electrode E such as an open spiral winding of copper wire or a transparent conductive coating. Current is provided from a bank of capacitors connected across the anode and cathode and at a voltage somewhat less than the ionizing potential of the contained gas. The flash is initiated by applying an ionizing potential to the gas, e.g., between an internal electrode and the outer trigger electrode.

Due to the relative size of the tube 73 and the reflective interior of the lower platen 71 when the components are designed for rapid copying of commercial sales tags on commercially available heat-sensitive copy-paper, it has been found difficult if not impossible to prevent arcing between the trigger electrode and the platen when using conventional trigger circuits with the trigger electrode at high potential. The circuit indicated in FIGURE 12 obviates this difficulty, increases the operational safety of the apparatus, and, unlike known prior art triggering circuits, introduces no added series resistances or inductances between the flash tube electrodes and the energy storage capacitor C. The circuit thus combines the desired high speed discharge with a grounded trigger electrode. The electrodes 74, 79 of the tube 73 are directly connected across a capacitor C which is charged from a suitable D.C. voltage supply indicated at V, usually provided from a 110 volt A.C. source through a transformer and rectifier circuit. The trigger circuit capacitor $C_T$ is likewise charged from D.C. voltage source $V_1$ and is discharged through the primary of step-up transformer T, the secondary of which has one end connected to ground and the other end connected to an electrode of the flash tube, by closing the switch S. The trigger electrode E, here illustrated as an open helix surrounding the flash tube 73, is likewise connected to ground. There is thus established an ionizing potential within the tube 73 which renders the gaseous contents sufficiently conductive to discharge the condenser C and produce the desired high-intensity high-speed flash. The reflector housing and other components of the platen systems remain at ground potential with no danger of arcing.

The copying and re-setting sequence is initiated, as heretofore indicated, by insertion of a suitable card or sales tag in the slot provided between platen members 20 and 70 and against a suitable actuating switch or switches. The remainder of the sequence may then be controlled in any of a number of ways, for example by suitable motor-driven cam and switch combinations, or through relays and time-delay circuits the operation of which is initiated by the movement of the platen, or through combinations of these and other components well known in the art. The sequence is indicated in FIGURE 11. Insertion of the card closes a switch causing the solenoid to bring the platens together. A safety device may be included to insure accurate alignment of the card before the platens will close and the sequence continue. After a short delay, where the same is required to permit the platen to come to rest, the trigger circuit is fired, which in turn fires the flash tube and produces the desired copy. The solenoid is then de-activated, permitting the platens to separate and the card to be withdrawn. At the same time the copy-tape is advanced one frame. The cycle is then complete and the device is again in condition for actuation. As previously indicated, the entire sequence is accomplished in as little as two seconds.

In a specific example, the strip of heat-sensitive copy-paper is five-eighths inch in width and the sales ticket is about 2⅝ inches in width. The full ⅝ x 2⅝ inch area is uniformly irradiated by a flash produced by discharging a bank of three series-connected 450 volt 525 mfd. condensers, charged to approximately 1000 v. D.C., through a gas-filled tube having an arc length between electrodes of 2.9 inches and an external diameter of about ¼ inch. The flash discharge is triggered by the discharge of the condenser $C_T$, charged to approximately 330 v. D.C., through a step-up transformer T to provide an effective trigger voltage of at least about 5000 volts. Firing of the flash tube occurs at about 0.2 second after actuation of the sequence by insertion of the card, and the platens separate for removal of the card at about 0.35 second. The copy-strip is then drawn forward to the next position, and the condensers are re-charged, within a total expired time of about 1.8 seconds; and the cycle is ready to repeat.

Additional functions may be incorporated and are frequently desirable. The apparatus is desirably rendered temporarily inoperative by removal of shielding cover members so as to prevent any possibility of electrical shock during repair or adjustment. Devices for facilitating threading of the copy-strip, for preventing initiation of the copy sequence in the absence of copy-strip, and for bringing the measuring roll 15 to end-of-cycle position when starting a new reel of copy-strip, have been provided and are desirable refinements. Similarly, a buzzer or lamp signal has been incorporated, to inform the operator when a copy has not been made due to inaccurate positioning of the tag or for other reasons. However these refinements are not essential, effective operation being obtained with the basic apparatus and circuitry as hereinbefore indicated when manipulated by competent personnel.

The recording apparatus of FIGURE 1 is normally operated in the position there indicated, and with the visibly heat-sensitive surface of the copy-paper 10 facing the perforated card 80. Under such conditions a mirror is preferably placed beneath the printed portion of the strip between the platen and the measuring roller so that a reflection of the printed area may be seen by an operator, as a further check on the operation of the machine. However the copy-strip may be so designed and positioned as to form the visible markings on its upper surface, being then directly visible to the operator; or the orientation of the recorder itself may be suitably altered to provide for direct visual inspection of the freshly printed area.

Many heat-sensitive copy-papers are known which are useful in the processes of the present invention. A typical copy-paper consists of a thin paper support coated on one surface with a thin adherent layer of a mixture of particles of ferric stearate and of the reaction product of hexamethylenetetramine and gallic acid, supported in a polyvinyl butyral binder. The initially light tan coating is converted to a deep black appearance when briefly heated to copying temperature, e.g., to 120° C.

Another useful but somewhat less desirable type of heat-sensitive copy-paper has as the heat-sensitive coating an initially opaque layer of fusible waxy particles held in place with a non-fusing binder, the layer converting at an elevated temperature to a permanently clear and transparent state.

These and other useful heat-sensitive copy-papers are described in Miller et al. U.S. Patents Nos. 2,663,654–7 and Clark et al. U.S. Patent No. 2,710,263, the disclosures of which are included herein by reference.

The apparatus may also be used, with but minor modification, to provide copies of printed rather than punched cards. As is fully disclosed in the Miller et al. and Clark et al. patents previously mentioned, the areas of such cards which have been printed with radiation-absorbing ink or the like are selectively absorptive of heat-producing radiation and provide a corresponding heat-pattern when thus irradiated. With proper control of the copy-strip employed, the intensity, quality and duration of the irradiation, the conservation of the heat-pattern, and the pressure contact between card and copy-strip, copies are effectively made on the strip from such printed cards by "front-printing" methods. This is accomplished by inserting the card between the strip 10 and the upper platen 20, closing the assembly, and irradiating through the copy-strip.

Heat-sensitive copying-papers such as are described in the Miller et al. and Clark et al. patents are useful for copying printed or typed originals by both back-printing and front-printing techniques. Front-printing is accomplished by directing the radiation toward the printed surface through the superposed copy-paper, which must therefore be capable of transmitting the radiation employed. The introduction of radiation-absorbing components such as carbon black in the copy-paper, either in the heat-sensitive layer or in or on the paper support layer, might be expected to be essential to the successful copying of punched cards. While such modified copy-paper is indeed useful for the purpose, it is now unexpectedly found that fully effective copies of punched cards may be produced as herein described, using a wide variety of sensitive copying-papers including the essentially fully radiation-transmissive copy-paper of the Miller et al. or Clark et al. patents, in either the front-printing or the back-printing position. The copying of punched cards in such manner has for convenience been termed "pocket-printing."

This pocket-printing method has been found to be applicable to the copying of punched holes in fully transparent plastic sheets as well as in highly reflective paper or cardboard. Irradiation of the composite of copy-paper and transparent sheet with brief intense radiation as heretofore defined is found to promote the desired change in the areas of the copying-paper overlying the punched areas, deep indentations or grooves, or other "pockets" in the transparent plastic sheet substance. The method makes possible the direct copying on heat-sensitive copy-paper of information contained on plastic or fibrous or other matrices having intelligence-denoting indentations or projections which, while being visibly distinct, need not differ in reflectivity or absorptivity from other sheet areas.

What is claimed is as follows:

1. An apparatus for permanently recording, in a form adapted for automatic scanning and on a continuous heat-sensitive copy-strip, the data provided by a series of independent coded information cards the information areas of which visibly differ from non-information areas, said apparatus comprising, in combination: means for smoothly supporting in fixed position an entire information-carrying segment of one of said cards and a corresponding segment of said copy-strip as a two-ply combination under pressure-contact in position for uniform irradiation of the entire segment of said card and at least those areas of said copy-strip adjacent the information areas thereof while restricting heat loss from said combination; means for strongly and briefly uniformly and simultaneously irradiating said entire segment of said card, and at least said adjacent areas of said copy-strip, with said radiant energy; means for releasing said pressure-contact and for advancing said copy-strip to the next succeeding fixed position; and means for inaugurating the operation of the several means, in a single cycle and in the sequence given, on the insertion in said apparatus of said information card.

2. In an apparatus for transcribing coded information from a series of cards to a continuous record tape for subsequent scanning by a reading mechanism requiring exact alignment of transcribed information on said tape, said cards having at least two alignment apertures in prescribed orientation both with the leading edge of said card as inserted in said apparatus and with coded information carried by said card, the combination comprising: close-fitting guide means for guiding the card during insertion in the apparatus; stop means for limiting the depth of insertion of said card; a control switch member in position for actuation on contact with said card when the card is inserted in approximately correct alignment, a plurality of alignment pins corresponding to said alignment apertures and in position adjacent the corresponding plural apertures of a fully inserted and properly oriented card; means for advancing said pins toward and through said card at corresponding alignment apertures thereof, and for retracting said pins away from said card; and means for interrupting the transcribing cycle on the misalignment of an information card within said apparatus, including means for sensing said mis-alignment.

3. In an apparatus for copying information on a heat-sensitive copy-sheet from an original having information areas and visibly different non-information areas and in which an entire information-carrying segment of said original and at least the areas of said copy-strip adjacent the information areas thereof are strongly and briefly uniformly and simultaneously irradiated from an electronic gas discharge flash lamp, a flash circuit including a trigger circuit comprising a grounded trigger electrode covering a portion of said lamp removed from the terminal electrodes thereof, an ignition transformer having a primary winding and having a secondary winding one end of which is connected to ground and the other end of which is directly connected to a said terminal electrode, and a source of electrical energy for connection across said primary; and an energy storage capacitor directly connected to the terminal electrodes of said gas discharge flash lamp.

4. The method of permanently recording, on a continuous heat-sensitive copy-strip and in a form adapted for automatic scanning, the data provided by a series of independent coded information cards having information areas and visibly different non-information areas, which comprises reproducing the information areas of a series of said cards in sequence on said copy-strip, and in a form suitable for automatic scanning, by strongly and briefly simultaneously and uniformly irradiating an entire information-carrying segment of each of said cards and at least those areas of a corresponding segment of said copy-strip adjacent the information areas thereof while smoothly supporting said segments in fixed position as a two-ply combination under pressure-contact and while restricting heat loss from said combination, and advancing said copy-strip to the next succeeding position after each such irradiation.

5. The method of reproducing the information contained on a punched information card comprising placing a heat-sensitive copying-paper in pressure-contact with a face of said card, and strongly and briefly irradiating said card and at least the areas of said copying-paper adjacent the openings of said card with radiation from an electronic gas discharge flash lamp while retaining said copying-paper and card in fixed position.

6. The method of reproducing information from an original having a visible pattern of raised surface areas defining said information and an associated pattern of depression or pocket areas, comprising placing a sensitive copying-paper in pressure-contact with said original to provide full contact with said raised areas only, and then strongly and briefly irradiating said original and at least those areas of said copy-paper overlying said pocket areas with intense radiant energy while retaining said copying-paper and original in fixed position, and with visible change occurring in said copying-paper at areas overlying said pocket areas.

7. An apparatus for permanently recording data provided by a series of independent coded information cards each having visibly distinct information and background areas and a plurality of alignment apertures, the data being rapidly automatically transcribed on a continuous heat-sensitive copy-strip in aligned position and adapted for automatic scanning, transcription being accomplished by simultaneous brief intense irradiation of the coded areas of said card and at least the areas of said copy-strip adjacent the information areas thereof; said apparatus comprising, in combination: means for accurately aligning each said card in relation to said copy-strip; means for smoothly supporting in fixed position an entire information-carrying segment of a said card and a corresponding segment of said copy-strip as a two-ply combination under pressure-contact in position for uniform irradiation; means for flash irradiating the composite in said fixed position; means for advancing said copy-strip to a next succeeding position; and means for initiating the sequence of operation of said alignment, support, irradiation and advance means on insertion in said apparatus of said information card.

8. An apparatus as herein described, for making a permanent record on a continuous heat-sensitive copy-strip of each of a series of information tickets, each said ticket having a free end section having a series of spaced data-providing apertures and at least two alignment apertures all in prescribed orientation with the leading edge of said section, and wherein the insertion of said free end section in required alignment initiates a complete recording sequence without further motion of said ticket; said apparatus comprising: close-fitting guide means for aligning said ticket-end during insertion; stop means for limiting the depth of insertion; switch means actuated by a said ticket-end inserted in proper alignment; transparent support means for smoothly supporting in fixed position a composite of an entire apertured free end section of a said ticket and a corresponding segment of said copy-strip; a reciprocative flat platen for pressing said composite against said support means in position for irradiation; strip retaining means associated with said platen for holding consecutive segments of said copy-strip in position for cooperation with ticket end-sections; a plurality of alignment pins carried by said platen in position adjacent the corresponding plural alignment apertures of a fully inserted and properly aligned and oriented ticket-end; means for advancing said platen toward said transparent support means and for advancing said pins toward and through said alignment apertures; alignment control means for interrupting said recording sequence on mis-alignment of said ticket-end, including means for sensing said mis-alignment; a gas discharge flash lamp having terminal electrodes and mounted adjacent said transparent support means in position for flash irradiation of said composite; a flash circuit including a trigger circuit comprising a grounded trigger electrode covering a portion of said lamp removed from said terminal electrodes, an ignition transformer having a secondary winding one end of which is connected to ground and the other end of which is directly connected to a said terminal electrode, and an energy storage capacitor directly connected to said terminal electrodes; firing means for applying a voltage across the primary of said transformer; means for retracting said platen and said pins after firing of said flash lamp; and means for advancing said copy-strip to the next succeeding fixed position; the complete sequence of sensing, aligning, pressing, irradiating, retracting and re-positioning being initiated by actuation of said switch means on insertion of said ticket-end.

References Cited in the file of this patent

UNITED STATES PATENTS

| | | |
|---|---|---|
| 1,592,348 | Evins | July 13, 1926 |
| 2,495,301 | Wengel | Jan. 24, 1950 |
| 2,501,904 | Jonsson | Mar. 28, 1950 |
| 2,622,229 | Lord | Dec. 16, 1952 |
| 2,697,649 | Roth | Dec. 21, 1954 |
| 2,736,023 | Williams | Feb. 21, 1956 |
| 2,740,895 | Miller | Apr. 3, 1956 |
| 2,740,896 | Miller | Apr. 3, 1956 |
| 2,749,482 | Fruengel | June 5, 1956 |
| 2,844,733 | Miller et al. | July 22, 1958 |
| 2,873,408 | Parker et al. | Feb. 10, 1959 |
| 2,891,165 | Kuhrmeyer et al. | June 16, 1959 |